United States Patent
Vermani et al.

(10) Patent No.: US 10,743,290 B2
(45) Date of Patent: Aug. 11, 2020

(54) COORDINATED UPLINK (UL) MULTI-USER MULTIPLE-INPUT-MULTIPLE-OUTPUT (MU-MIMO) COMMUNICATION

(71) Applicant: QUALCOMM Incorporated, San Diego, CA (US)

(72) Inventors: Sameer Vermani, San Diego, CA (US); Bin Tian, San Diego, CA (US); Yan Zhou, San Diego, CA (US); George Cherian, San Diego, CA (US); Abhishek Pramod Patil, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/028,332

(22) Filed: Jul. 5, 2018

(65) Prior Publication Data
US 2019/0014555 A1    Jan. 10, 2019

Related U.S. Application Data

(60) Provisional application No. 62/530,055, filed on Jul. 7, 2017.

(51) Int. Cl.
*H04W 72/04* (2009.01)
*H04B 7/0452* (2017.01)
(Continued)

(52) U.S. Cl.
CPC .......... *H04W 72/04* (2013.01); *H04B 7/0452* (2013.01); *H04B 7/0617* (2013.01);
(Continued)

(58) Field of Classification Search
CPC .. H04B 7/2121; H04B 7/2123; H04B 7/0617; H04B 7/0452; H04J 2203/0069;
(Continued)

(56) References Cited

U.S. PATENT DOCUMENTS 7,539,181 B2 * 5/2009 Beshai ............... H04Q 11/0005
370/369
9,019,849 B2 * 4/2015 Hui ..................... H01Q 3/2611
370/252
(Continued)

FOREIGN PATENT DOCUMENTS

| EP | 2710838 A1 | 3/2014 |
|---|---|---|
| WO | WO-2012160977 A1 | 11/2012 |
| WO | WO-2016040837 A1 | 3/2016 |

OTHER PUBLICATIONS

Partial International Search Report—PCT/US2018/041022—ISA/EPO—dated Sep. 24, 2018.
(Continued)

*Primary Examiner* — Sharad Rampuria
(74) *Attorney, Agent, or Firm* — Patterson + Sheridan, LLP

(57) ABSTRACT

Certain aspects of the present disclosure are directed to an apparatus for wireless communication. The apparatus generally including a processing system configured to generate a first frame including an indication of whether resources are available to be shared with a first one or more wireless nodes, where the apparatus is part of a first basic service set and the first one or more wireless nodes are part of one or more second basic service sets, and a first interface configured to output the first frame for transmission.

18 Claims, 12 Drawing Sheets

(51) Int. Cl.
    *H04B 7/06*    (2006.01)
    *H04W 28/08*    (2009.01)
    *H04J 11/00*    (2006.01)
    *H04W 16/10*    (2009.01)
    *H04W 72/08*    (2009.01)

(52) U.S. Cl.
    CPC ......... *H04J 11/0053* (2013.01); *H04W 16/10* (2013.01); *H04W 28/08* (2013.01); *H04W 72/082* (2013.01)

(58) Field of Classification Search
    CPC .......... H04J 11/0053; H04Q 2213/394; H04W 72/04; H04W 72/12; H04W 76/00; H04W 28/08; H04W 16/10; H04W 72/082
    See application file for complete search history.

(56) References Cited

U.S. PATENT DOCUMENTS

| | | | |
|---|---|---|---|
| 9,042,333 B2* | 5/2015 | Shattil | H04B 7/026 370/329 |
| 10,037,689 B2* | 7/2018 | Taylor | G08G 1/096775 |
| 2017/0294949 A1* | 10/2017 | Zhang | H04B 7/0617 |

OTHER PUBLICATIONS

International Search Report and Written Opinion—PCT/US2018/041022—ISA/EPO—dated Jan. 28, 2019.

\* cited by examiner

700A

702A

MEANS FOR OBTAINING, FROM A FIRST WIRELESS NODE, A FIRST FRAME INCLUDING AN INDICATION OF WHETHER RESOURCES OF A FIRST BASIC SERVICE SET (BSS) ARE AVAILABLE TO BE SHARED WITH A SECOND BSS

704A

MEANS FOR GENERATING A SECOND FRAME INDICATING AN INTENTION OF THE APPARATUS TO USE AT LEAST A PORTION OF THE AVAILABLE RESOURCES

706A

MEANS FOR OUTPUTTING THE SECOND FRAME FOR TRANSMISSION

COORDINATED UPLINK (UL) MULTI-USER MULTIPLE-INPUT-MULTIPLE-OUTPUT (MU-MIMO) COMMUNICATION

CLAIM OF PRIORITY UNDER 35 U.S.C. § 119

This application claims the benefit of U.S. Provisional Patent Application Ser. No. 62/530,055, filed Jul. 7, 2017, which is herein incorporated by reference in its entirety.

FIELD

Certain aspects of the present disclosure generally relate to wireless communications and, more particularly, to coordinated uplink transmissions.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

SUMMARY

Certain aspects of the present disclosure are directed to an apparatus for wireless communication. The apparatus generally including a processing system configured to generate a first frame including an indication of whether resources of a first basic service set (BSS) are available to be shared with a first one or more wireless nodes, wherein the first one or more wireless nodes are part of one or more second BSSs, and a first interface configured to output the first frame for transmission.

Certain aspects of the present disclosure are directed to an apparatus for wireless communication. The apparatus generally includes a first interface configured to obtain, from a first wireless node, a first frame including an indication of whether resources of a first basic service set (BSS) are available to be shared with a second one or more wireless nodes, wherein the second one or more wireless nodes are part of one or more second BSSs, a processing system configured to generate a second frame indicating whether at least a portion of the available resources are to be used for communication by the second one or more wireless nodes, and a second interface configured to output the second frame for transmission.

Certain aspects of the present disclosure are directed to an apparatus for wireless communication. The apparatus generally includes a first interface configured to obtain a first frame indicating resources allocated for communication with a first wireless node and obtain a second frame indicating resources allocated for communication with a first wireless node and obtain a second frame indicating resources allocated for communication with a second wireless node, wherein the first wireless node is part of a first basic service set (BSS) and the second wireless node is part of a second BSS, a processing system configured to generate a multi-user (MU) frame, and a second interface configured to output the MU frame for transmission via the resources indicated by the first frame and the second frame.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7A illustrates example components capable of performing the operations shown in FIG. 7.

DETAILED DESCRIPTION

Figure 1:
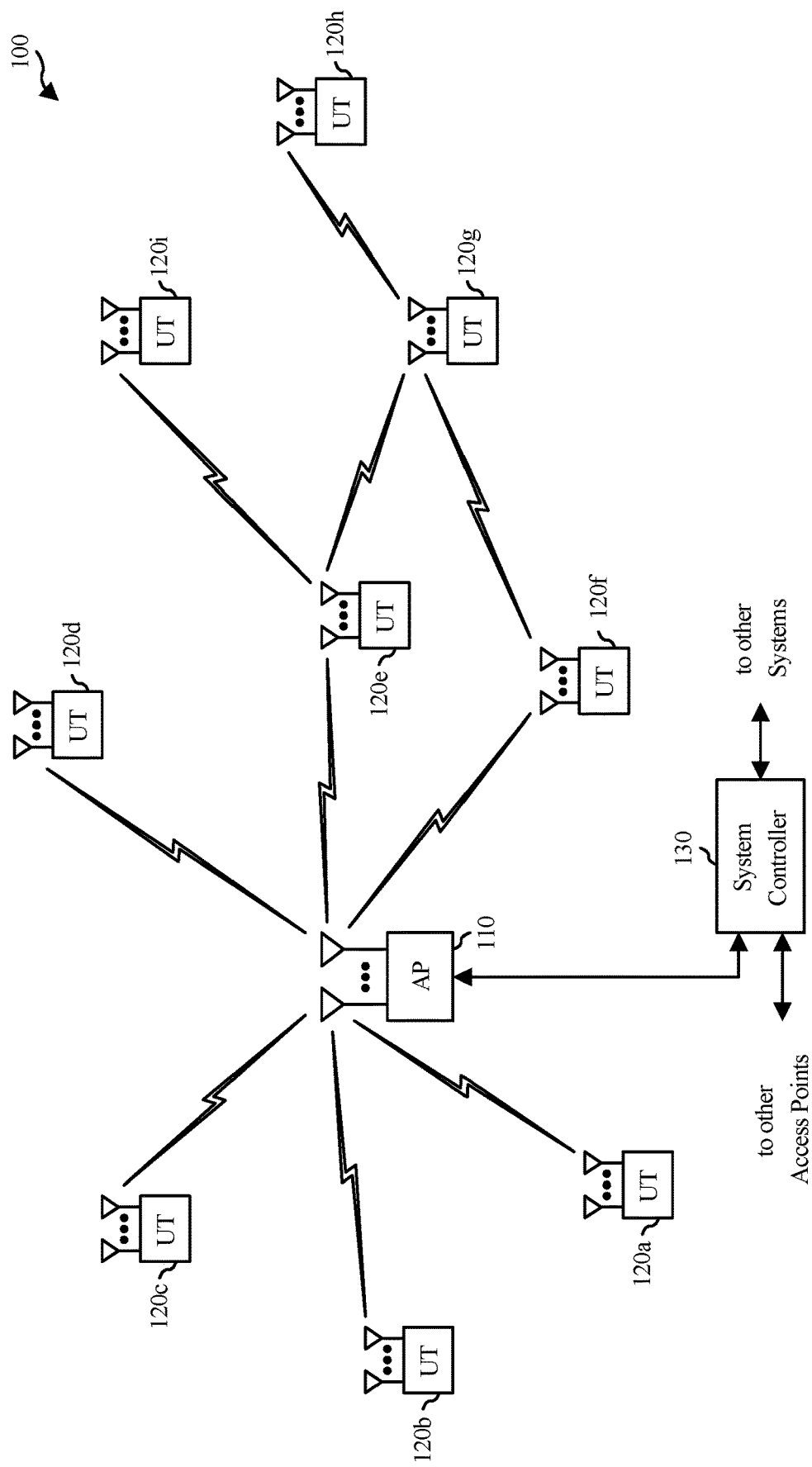
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple stations. A TDMA system may allow multiple stations to share the same frequency channel by dividing the transmission signal into different time slots, each time slot being assigned to different stations. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a station, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a system 100 in which aspects of the disclosure may be performed. The system 100 may be, for example, a multiple-access multiple-input multiple-output (MIMO) system 100 with access points and stations. For simplicity, only one access point 110 is shown in FIG. 1. An access point is generally a fixed station that communicates with the stations and may also be referred to as a base station or some other terminology. A STA may be fixed or mobile and may also be referred to as a mobile station, a wireless device, or some other terminology. Access point 110 may communicate with one or more stations 120 at any given moment on the downlink and uplink. The downlink (i.e., forward link) is the communication link from the access point to the stations, and the uplink (i.e., reverse link) is the communication link from the stations to the access point. A station may also communicate peer-to-peer with another station.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe stations 120 capable of communicating via Spatial Division Multiple Access (SDMA), for certain aspects, the stations 120 may also include some STA that do not support SDMA. Thus, for such aspects, an access point 110 may be configured to communicate with both SDMA and non-SDMA stations. This approach may conveniently allow older versions of stations ("legacy" stations) to remain deployed in an enterprise, extending their useful lifetime, while allowing newer SDMA stations to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected stations 120 collectively represents the multiple-output for downlink transmissions and the multiple-input for uplink transmissions. For pure SDMA, it is desired to have $N_{ap} \geq K \geq 1$ if the data symbol streams for the K stations are not multiplexed in code, frequency or time by some means. K may be greater than $N_{ap}$ if the data symbol streams can be multiplexed using TDMA technique, different code channels with code division multiple access (CDMA), disjoint sets of subbands with OFDM, and so on. Each selected STA transmits user-specific data to and/or receives user-specific data from the access point. In general, each selected STA may be equipped with one or multiple antennas (i.e., $N_{ut} \geq 1$). The K selected stations can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each STA may be equipped with a single antenna (e.g., in order to keep costs down) or multiple antennas (e.g., where the additional cost can be supported). The system 100 may also be a TDMA system if the stations 120 share the same frequency channel by dividing transmission/reception into different time slots, each time slot being assigned to different stations 120.

Figure 2:
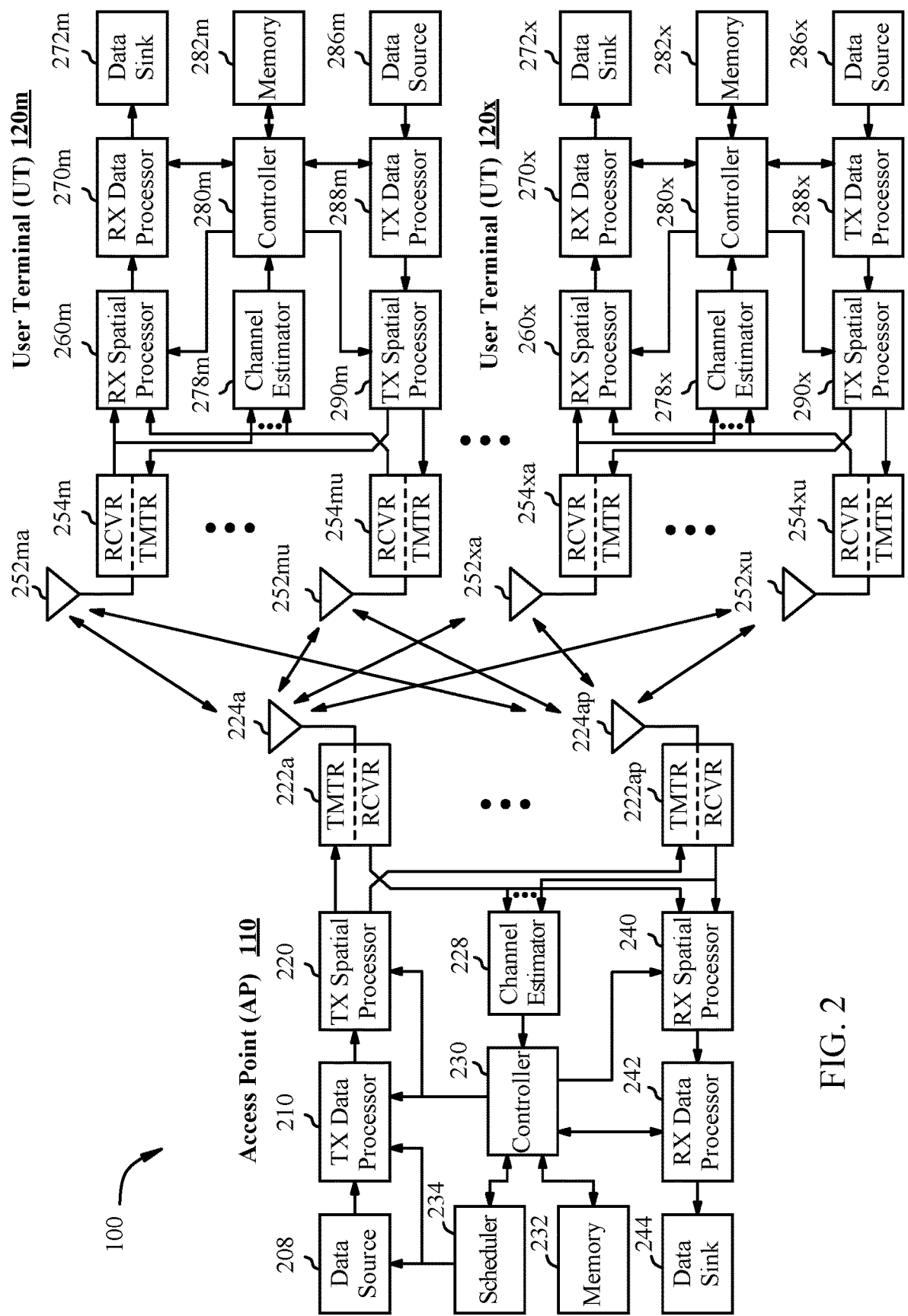
FIG. 2 is a block diagram of an example access point and example stations, in accordance with certain aspects of the present disclosure.

FIG. 2 illustrates example components of the access point 110 and station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 4 and 4A.

FIG. 2 illustrates a block diagram of access point 110 two stations 120m and 120x in a MIMO system 100. The access point 110 is equipped with $N_t$ antennas 224a through 224ap. STA 120m is equipped with $N_{ut,m}$ antennas 252ma through 252mu, and STA 120x is equipped with $N_{ut,x}$ antennas 252xa through 252xu. The access point 110 is a transmitting entity for the downlink and a receiving entity for the uplink. Each station 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup STA are selected for simultaneous transmission on the uplink, Ndn stations are selected for simultaneous transmission on the downlink, Nup may or may not be equal to Ndn, and Nup and Ndn may be static values or can change for each scheduling interval. The beam-steering or some other spatial processing technique may be used at the access point and station.

On the uplink, at each station 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup stations may be scheduled for simultaneous transmission on the uplink. Each of these stations performs spatial processing on its data symbol stream and transmits its set of transmit symbol streams on the uplink to the access point.

At access point 110, $N_{ap}$ antennas 224a through 224ap receive the uplink signals from all Nup stations transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing. The controller 230 may be coupled with a memory 232.

On the downlink, at access point 110, a TX data processor 210 receives traffic data from a data source 208 for Ndn stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides Ndn downlink data symbol streams for the Ndn stations. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the stations. The decoded data for each STA may be provided to a data sink 272 for storage and/or a controller 280 for further processing.

At each station 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the station.

At each station 120, a channel estimator 278 estimates the downlink channel response and provides downlink channel estimates, which may include channel gain estimates, signal-to-noise ratio (SNR) estimates, noise variance and so on. Similarly, at access point 110, a channel estimator 228 estimates the uplink channel response and provides uplink channel estimates. Controller 280 for each STA typically derives the spatial filter matrix for the STA based on the downlink channel response matrix Hdn,m for that STA. Controller 230 derives the spatial filter matrix for the access point based on the effective uplink channel response matrix Hup,eff. Controller 280 for each STA may send feedback information (e.g., the downlink and/or uplink eigenvectors, eigenvalues, SNR estimates, and so on) to the access point. Controllers 230 and 280 also control the operation of various processing units at access point 110 and station 120, respectively.

Figure 3:
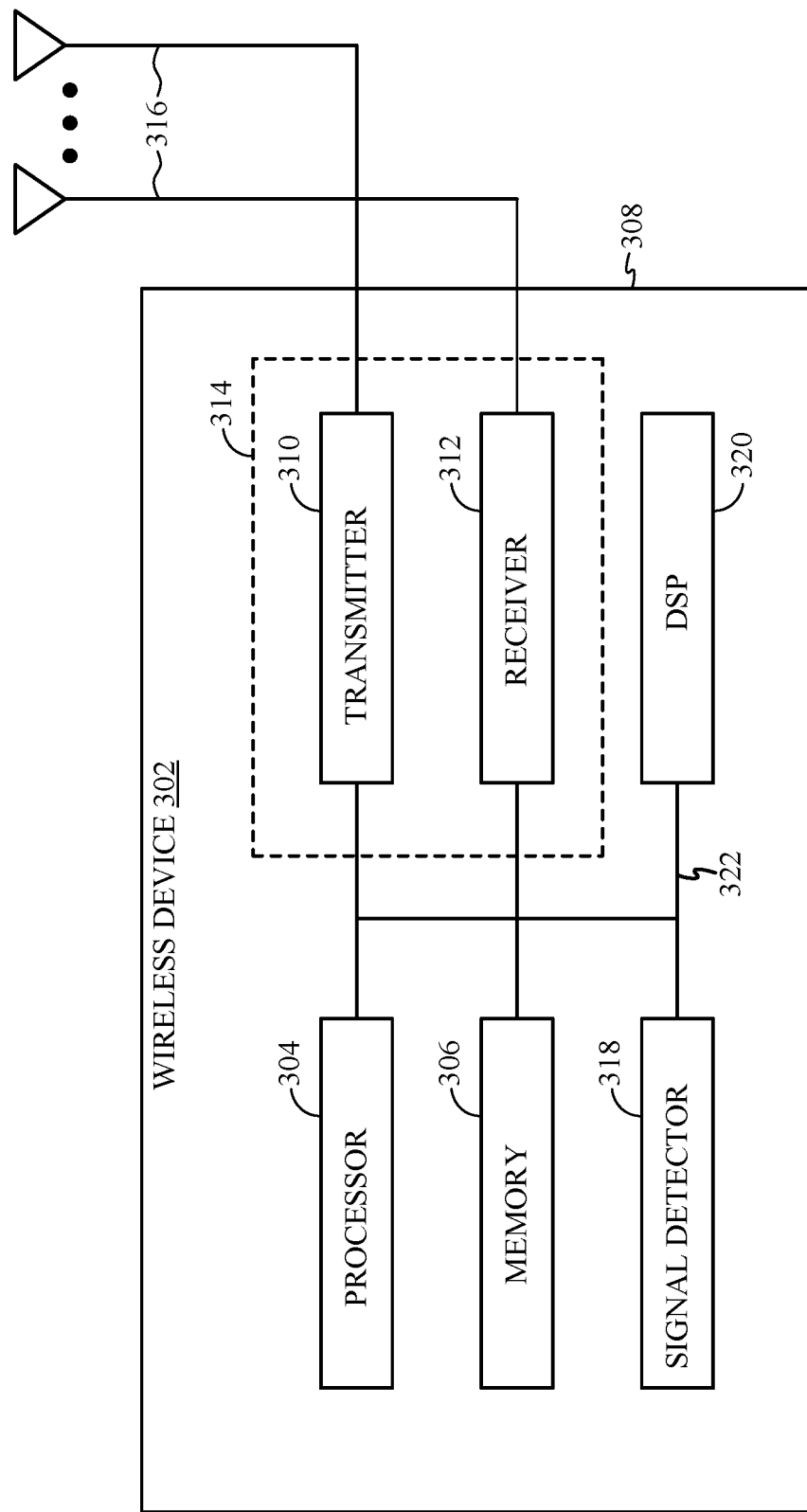
FIG. 3 illustrates an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 400 and FIG. 4, respectively. The wireless device 302 may be an access point 110 or a station 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Coordinated Uplink Communications

In uplink (UL) multi-user multiple-input-multiple-output (MU-MIMO), multiple stations may belong to one basic service set (BSS) transmitting in the UL. Other BSSs in hearing range may defer to an on-going transmission. Different BSSs in hearing range of each other (meaning they can at least detect each other's transmissions) may use time-divisional multiplexing (TDM) to transmit in the UL.

In coordinated UL MU-MIMO, multiple BSSs carry out simultaneous UL transmissions. Un-used receive spatial dimensions at an AP may be used to null the interference from an overlapping BSS (OBSS) transmissions. This enables a greater degree of spatial multiplexing when there are un-used spatial dimension within the BSS. In other words, the un-used spatial dimensions may allow for concurrent OBSS transmissions.

Figure 4:
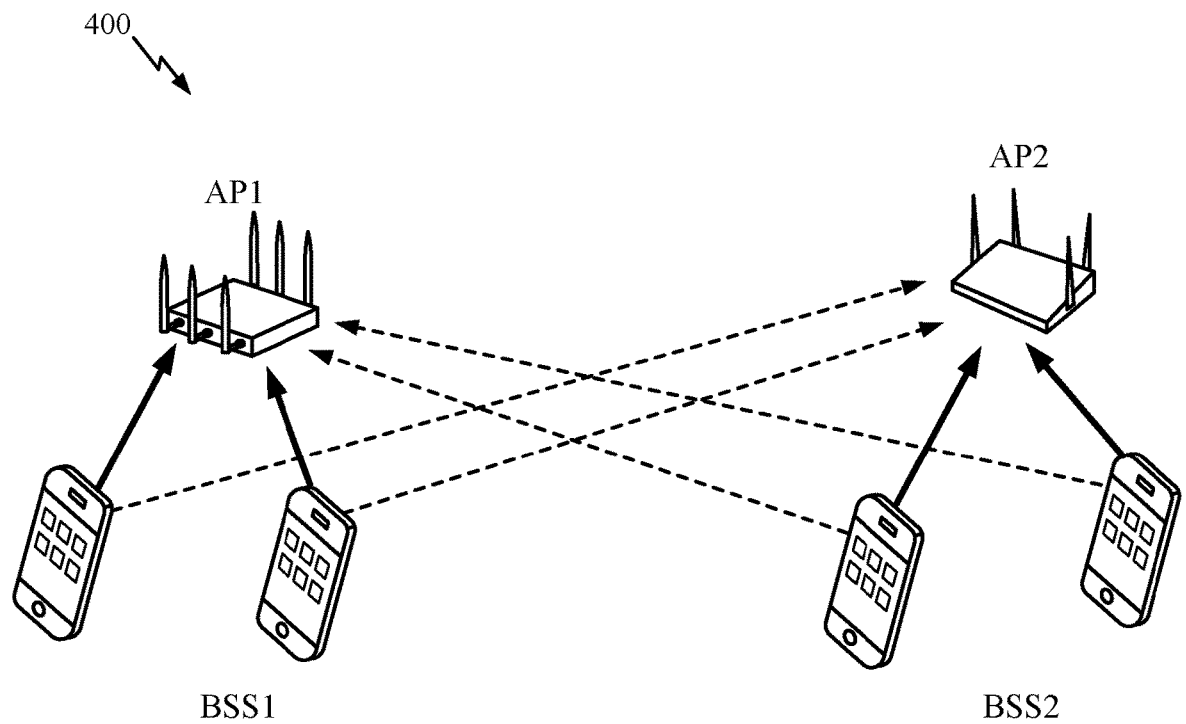
FIG. 4 illustrates a communication system using coordinated uplink (UL) multi-user multiple-input-multiple-output (MU-MIMO).

FIG. 4 illustrates an example of a communication system 400 using coordinated UL MU-MIMO, in which aspects of the present disclosure may be practiced. As illustrated, the signal from each station is intended to be transmitted to only one AP within their respective BSSs, as shown by the solid lines representing data transmissions to the AP the STAs are associated with. The data transmissions from the STAs cause interference to the other OBSS APs, as illustrated by the dotted lines. A signal for a user can be decoded by looking at received samples of one AP, and the transmission may happen without precoding. Unused dimensions at each AP may be used to eliminate (e.g., null out) interference from OBSS STAs.

Figure 5:
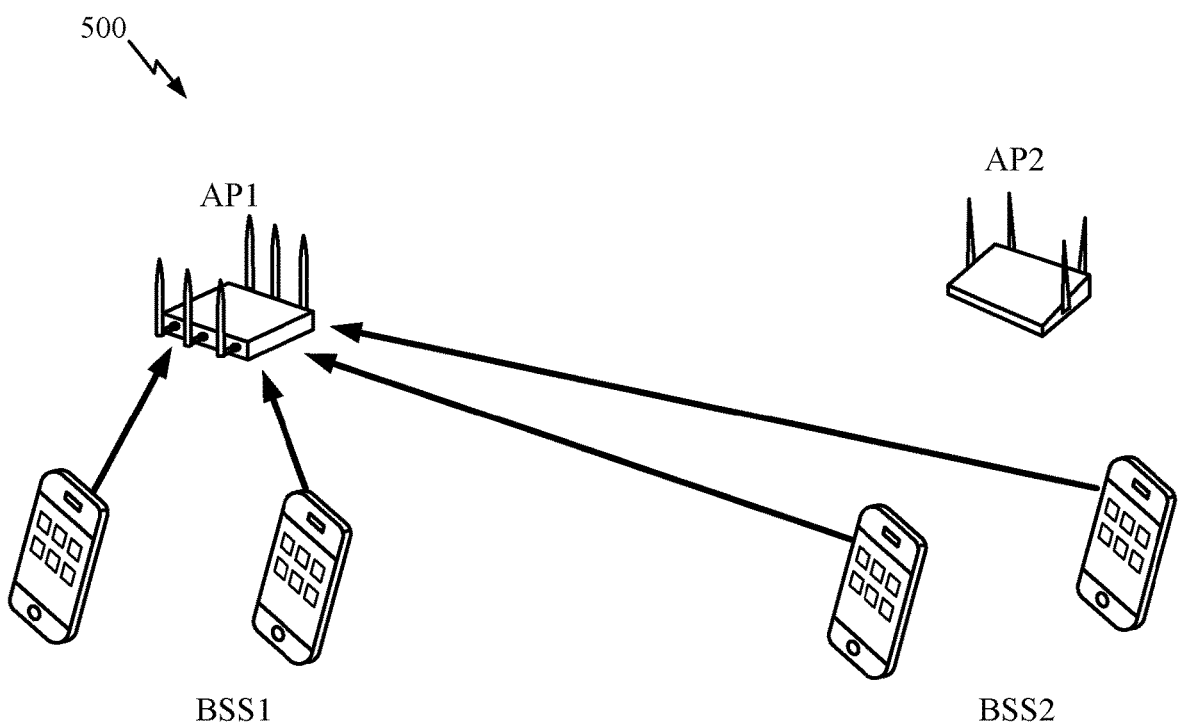
FIG. 5 illustrates a communication system using enhanced coordinated UL MU-MIMO, in accordance with certain aspects of the present disclosure.

FIG. 5 illustrates a communication system 500 using enhanced coordinated UL MU-MIMO, in accordance with certain aspects of the present disclosure. In this case, the stations of the second BSS (BSS2) are transmitting data to the AP of first BSS (BSS1). In other words, for enhanced coordinated UL MU-MIMO, a mix of in-BSS (e.g., STAs associated with AP1) STAs and OBSS STAs may transmit to a same AP (AP1 in this example). This may be useful, for example, in scenarios where an AP is collecting channel state information (CSI) feedback from in-BSS and O-BSS STAs simultaneously.

Aspects of the present disclosure provide several communication protocols that may be considered enhancements for performing coordinated UL MU-MIMO transmissions. For example, in certain aspects, a master AP (or other entity) may indicate to one or more slave APs, whether the master AP has un-used resources that can be shared with OBSS STAs. Rather than a master AP (that is part of a BSS), such an indication may be provided by another entity that may not be part of a BSS, such as a device acting as central processing unit, scheduler, or coordinator.

Figure 6:
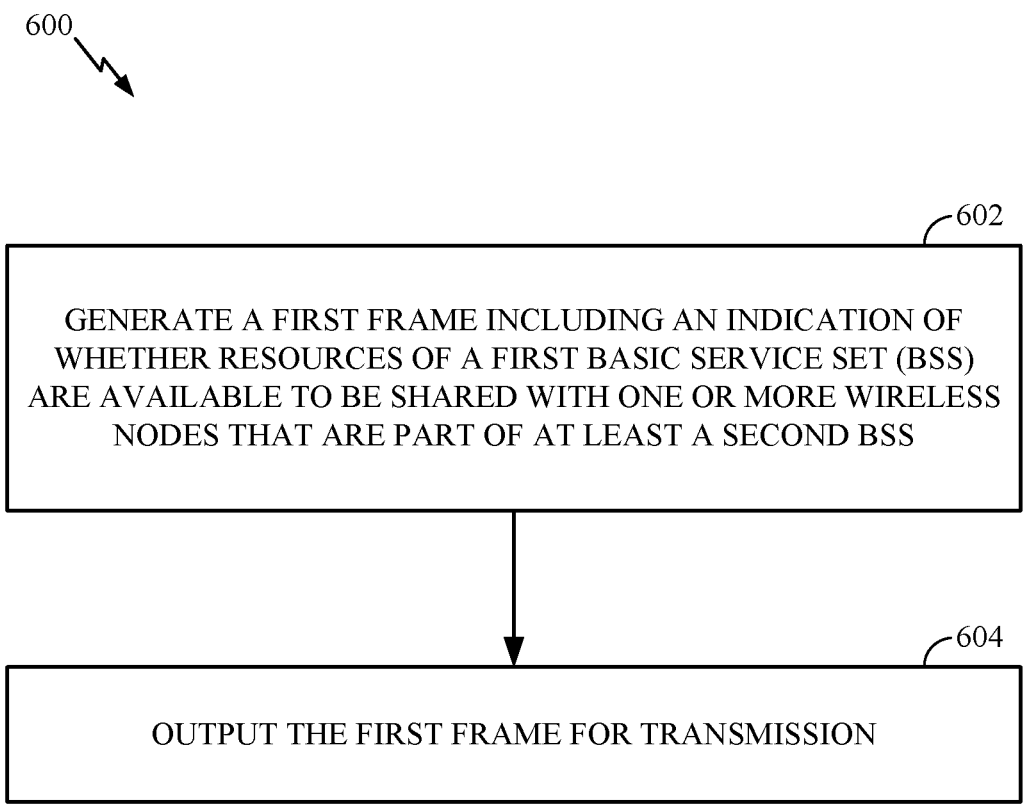
FIG. 6 is a flow diagram of example operations for wireless communication, in accordance with certain aspects of the present disclosure

FIG. 6 is a flow diagram of example operations 600 for wireless communication, in accordance with certain aspects of the present disclosure. The operations 600 may be performed by an apparatus such as a master access point (e.g., AP 110) or other entity, such as a central processing unit, scheduler, or coordinator.

The operations 600 begin, at 602, by generating a first frame including an indication of whether resources of a first basic service set (BSS) are available to be shared with one or more wireless nodes that are part of at least a second BSS. At 604, the first frame is output for transmission.

Figure 7:
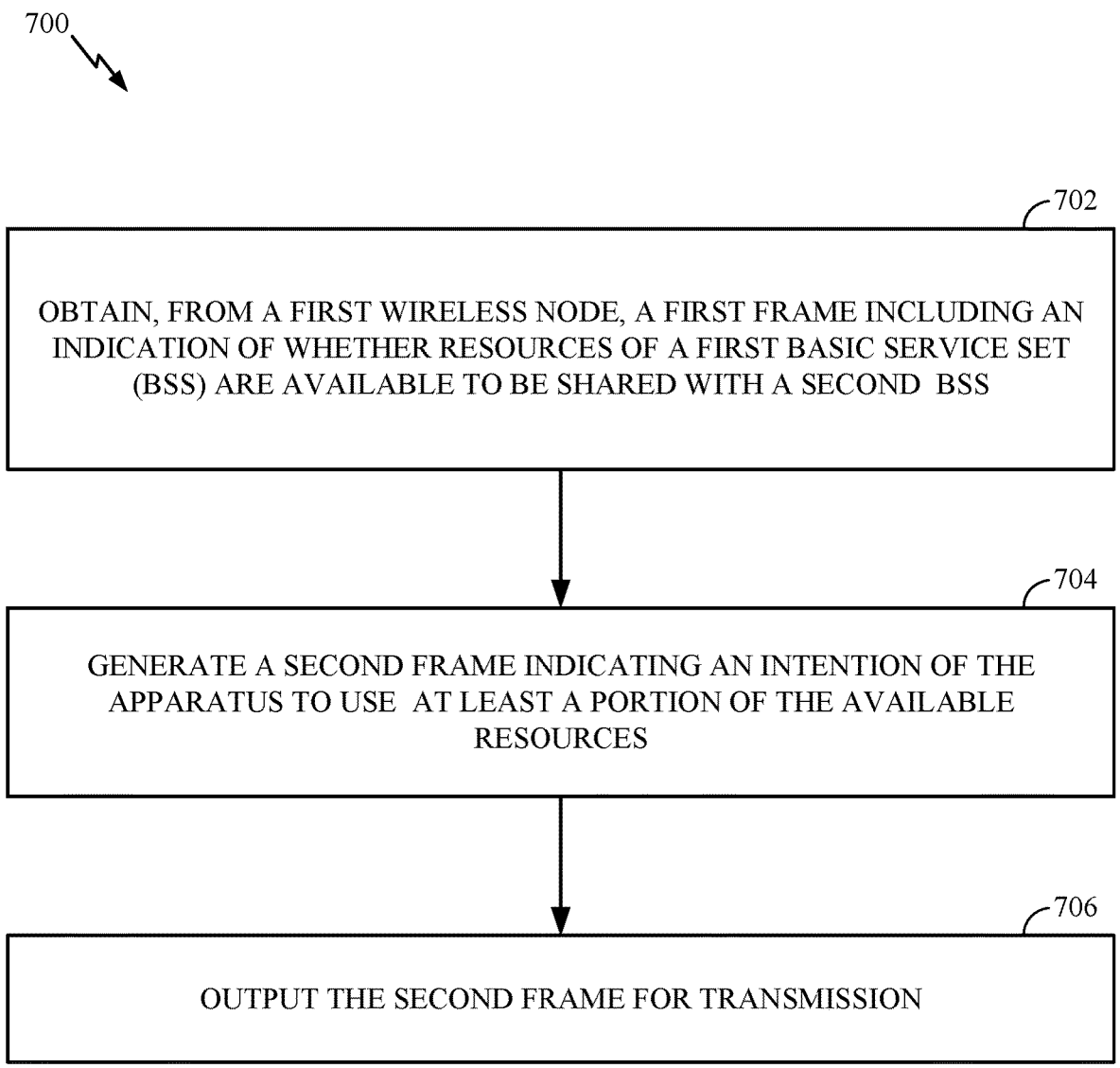
FIG. 7 is a flow diagram of example operations for wireless communication, in accordance with certain aspects of the present disclosure.

FIG. 7 is a flow diagram of example operations 700 for wireless communication, in accordance with certain aspects of the present disclosure. The operations 700 may be performed by an apparatus such as a slave access point (e.g., AP 110).

Operations 700 begin, at 702, by obtaining, from a first wireless node, a first frame including an indication of whether resources of a first basic service set (BSS) are available to be shared with a second BSS. At 704, the apparatus generates a second frame indicating an intention of the apparatus to use at least a portion of the available resources. At 706, the AP outputs the second frame for transmission.

Figure 8:
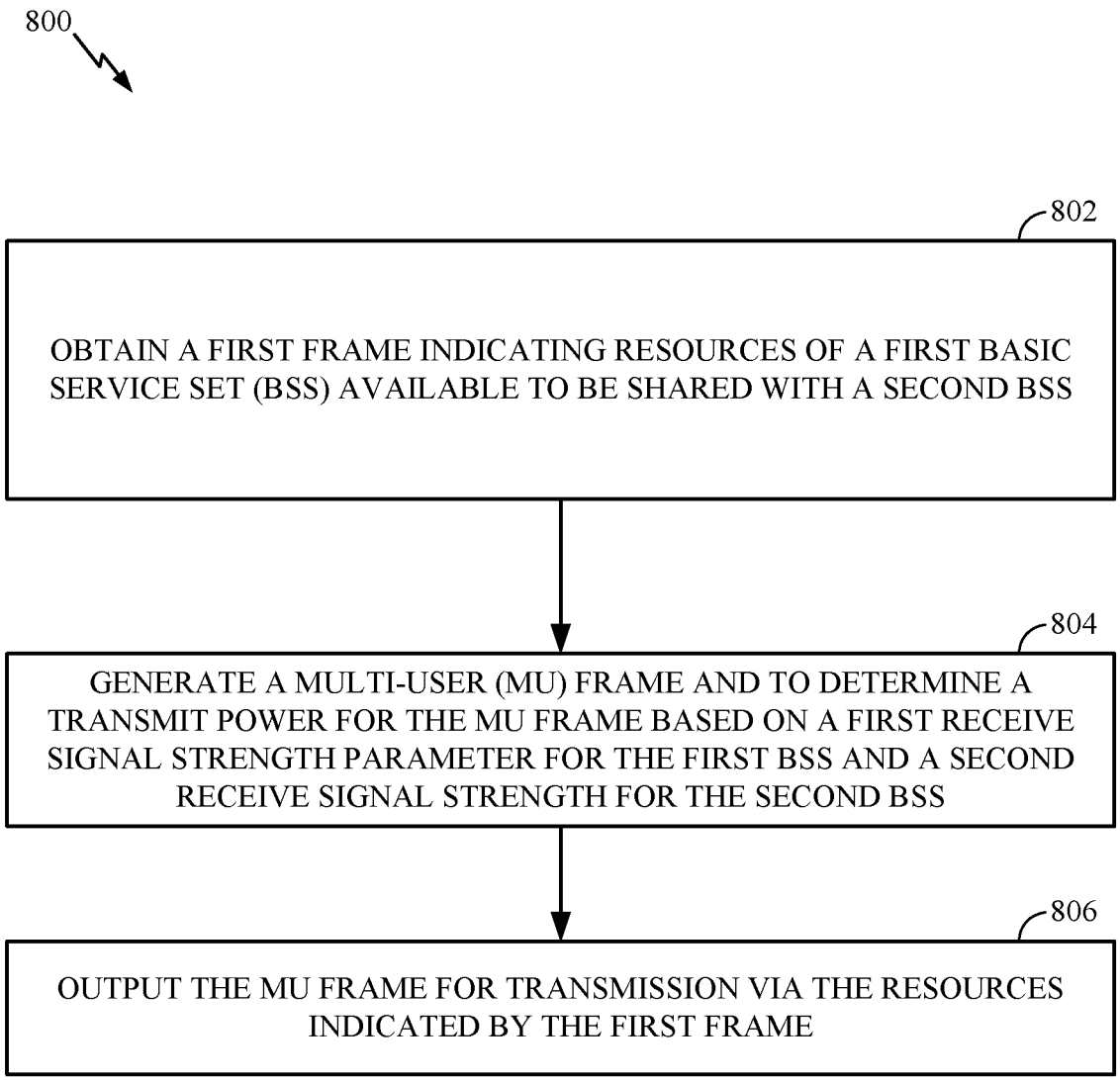
FIG. 8 is a flow diagram of example operations for wireless communication, in accordance with certain aspects of the present disclosure

FIG. 8 is a flow diagram of example operations 800 for wireless communication, in accordance with certain aspects of the present disclosure. The operations 800 may be performed by an apparatus such as a slave station (e.g., station 120 acting as an OBSS STA).

Operations 800 begin, at 802, by obtaining a first frame indicating resources of a first basic service set (BSS) available to be shared with a second BSS. At 804, the STA generates a multi-user (MU) frame and determines a transmit power for the MU frame based on a first receive signal strength parameter for the first BSS and a second receive signal strength for the second BSS. At 806, the STA outputs the MU frame for transmission via the resources indicated by the first frame.

Thus, after allocating the shared resources (by the controller or master AP) and determination of the resources by the AP in the first BSS, the simultaneous (MU-MIMO) transmissions may be obtained (by the AP in the first BSS) at the same time as devices in the first BSS are transmitting frames using one or more spatial streams. The receiving device in the first BSS may decode the plurality of frames based only on samples obtained by the apparatus in the second BSS.

Figure 9:
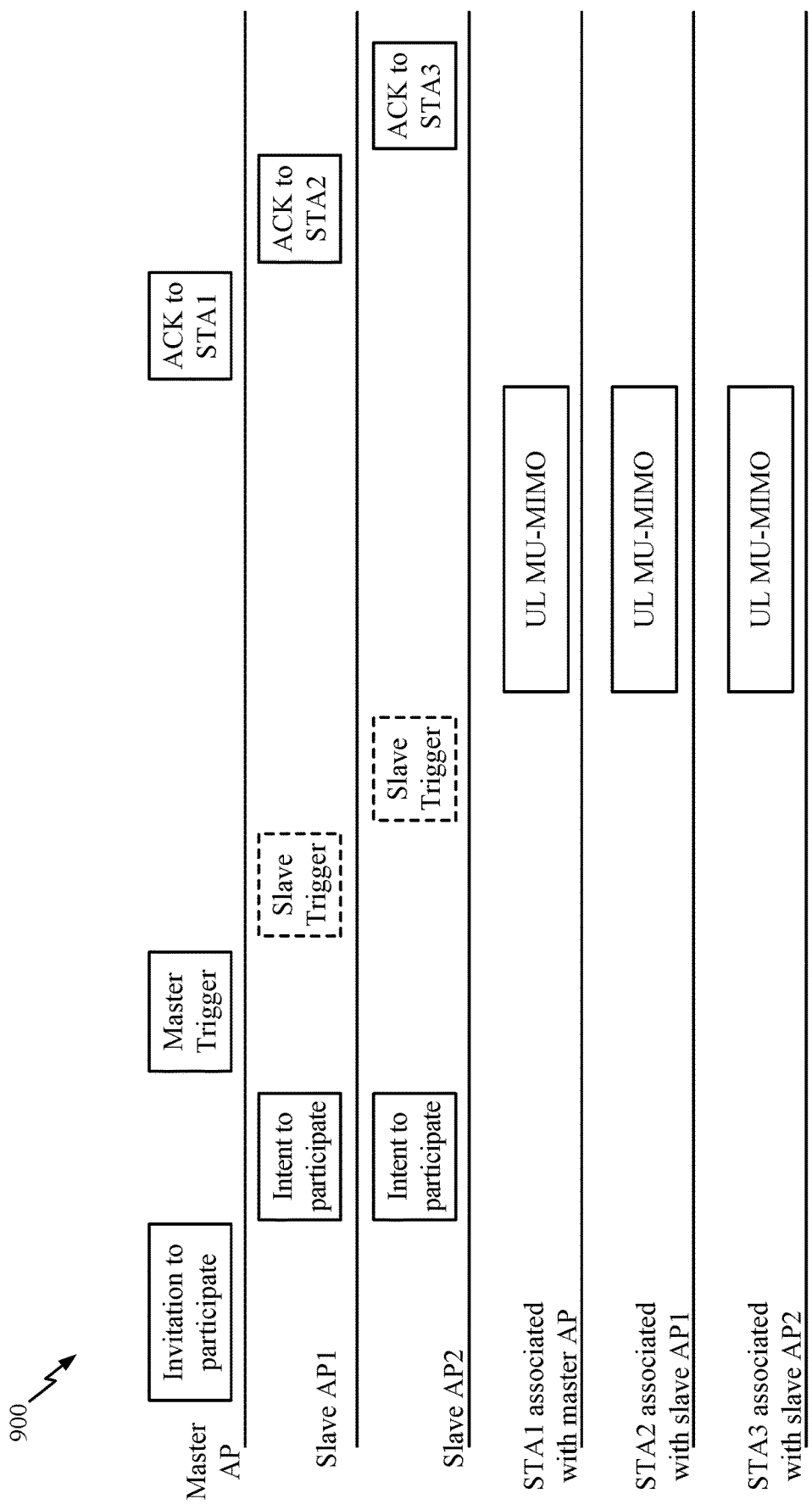
FIG. 9 illustrates an example protocol for enhanced coordinated UL MU-MIMO, in accordance with certain aspects of the present disclosure.
Figure 10:
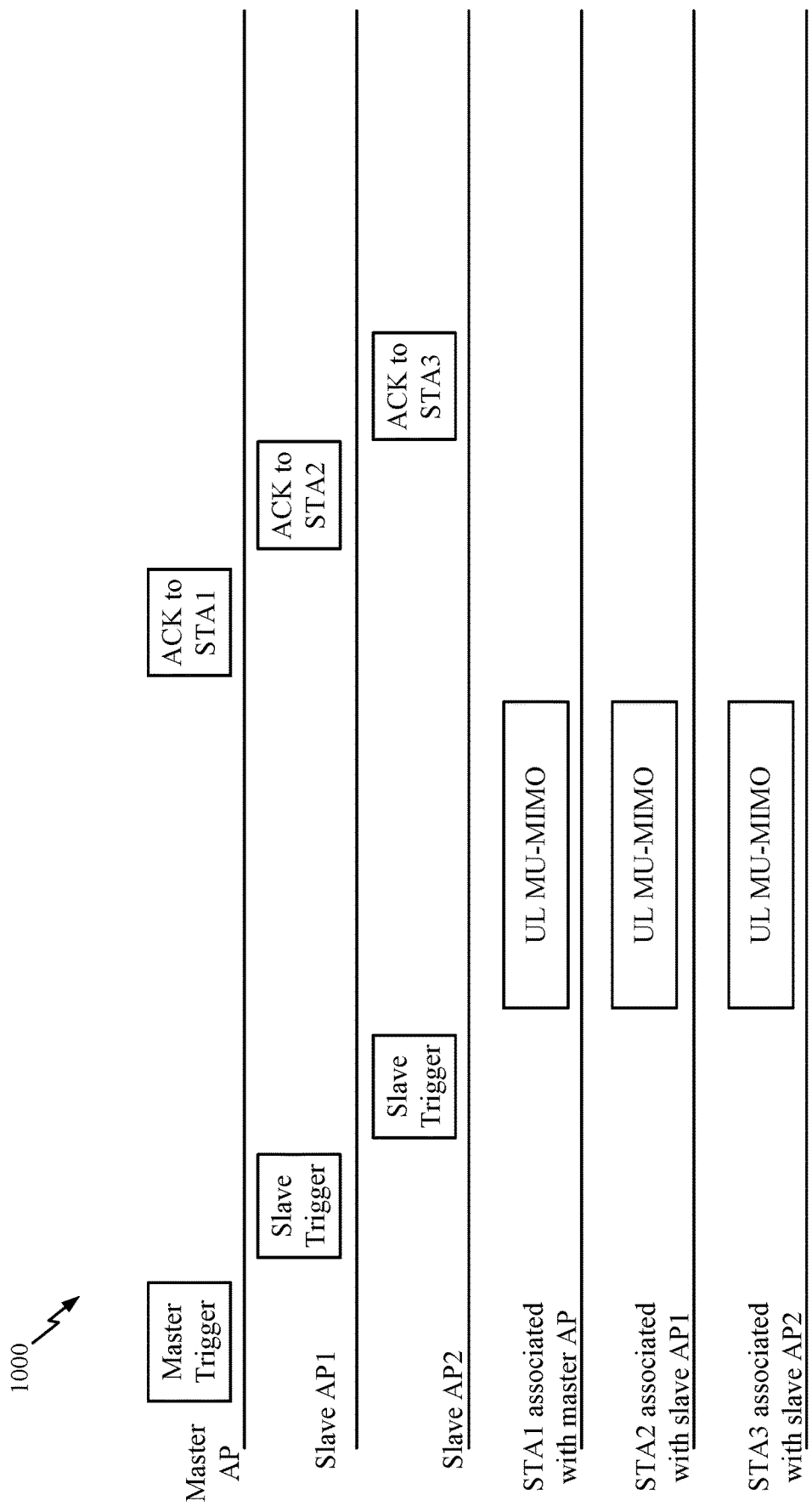
FIG. 10 illustrates an example protocol for enhanced coordinated UL MU-MIMO, in accordance with certain aspects of the present disclosure.

Operations 600, 700, and 800 of FIGS. 6, 7, and 8 are described in more detail with respect to FIGS. 9 and 10, which show the interaction between entities performing the respective operations.

FIG. 9 illustrates protocol timing diagram 900 of one option of an enhanced UL MU-MIMO protocol, in accordance with certain aspects of the present disclosure. As illustrated, the master AP may transmit an invitation to participate frame. In certain aspects, the invitation to participate frame may identify OBSS APs (e.g., slave AP1 and slave AP2), and indicate whether there are available (unused) spatial dimensions that can be shared with OBSS STAs (e.g., STA1 and STA2). In certain aspects, the invitation to participate frame may also indicate the number of empty spatial dimensions that are available for OBSS stations (STAs) (e.g., slave STAs).

The invitation to participate frame may also include a length of the transmission (e.g., during which the spatial dimensions are available) and total the number of dimensions being used by the master AP. The number of dimensions used by the master AP may be used by the slave APs to know how many spatial dimensions are needed to null the interference caused by the transmissions to the master AP.

The invitation to participate frame may also include a parameter or various parameters, such as a maximum receive signal strength indicator (RSSI) for the OBSS STAs. For example, the master AP may determine the level interference it can tolerate from the OBSS STAs, and set the maximum RSSI based on the level interference that can be tolerated. The invitation to participate frame may also include an indication of its transmit power, allowing for the calculation of path loss.

In response the invitation to participate frame, the slave APs send intent to participate frames, as illustrated. The intent to participate frame indicates whether the available spatial dimensions are accepted for use (an intention to use) by the corresponding slave STA of the slave AP. For example, the intent to participate frames may identify the respective AP, respective STAs, and spatial dimensions (e.g., streams) being requested/accepted.

In certain aspects, the intent to participate frames may also indicate the total spatial stream capability of the respective slave AP, allowing the master AP to know how many spatial dimensions the slave AP has available to null out transmissions to other APs when determining the allocation of resources to the STAs. In some cases, the intent to participate frames may also include an indication of the modulation and coding scheme (MCS) and target RSSI for slave STAs (e.g., if the slave APs are not sending slave trigger frames, as will be described in more detail). The intent to participate frames may also include an indication of their transmit power for path loss calculations.

The master AP may then transmit a master trigger frame, which may include the target RSSI for the master BSS STAs (e.g., STA1 in FIG. 9). The master trigger may also include the identification and the number of streams allocated to OBSS STAs, as well as the maximum RSSI for the OBSS STAs. The OBSS STAs may calculate the transmit power for their respective transmissions based on the target RSSI received from their respective slave APs, but subject to a maximum transmit power calculated based on the maximum RSSI indicated by the master AP. In certain aspects, the master trigger may also include an indication of a MCS for the slave STAs to send their respective transmissions, and an indication of transmit power for path loss calculations.

In certain aspects, the slave APs may optionally send slave trigger frames used for power control and synchronization. For example, the slave trigger frames may include the target RSSI for their respective slave STAs, an indication of MCS, and stream allocations. In some cases, the slave trigger frames may also include an indication of their transmit power for path loss calculations. The STAs may then send their respective UL MU-MIMO transmissions to the APs, followed by acknowledgements (ACK) of the UL MU-MIMO transmissions to each of the STAs, as illustrated.

In certain aspects, the intent to participate frames may be sent sequentially (e.g., instead of simultaneously). The master AP may also limit the number of intent to participate frames that are to be transmitted based on, for example, its own capabilities to process them. In certain aspects, the master trigger frame may also provide resources for transmission of intent to participate frames for a subsequent transmission. In some cases, the resources for the intent to participate frames may be mapped to a BSS color or BSS identifier (ID). In certain aspects, the slave triggers may be sent simultaneously rather than sequentially (e.g., using distributed OFDMA, where multiple APs participate in a joint OFDMA transmission).

Aspects of the present disclosure provide various protocols for time/frequency synchronization. For example, if slave triggers are not transmitted, every STA may synchronize to the master AP. In this case, since the APs are not synchronized, a common offset with respect to the other APs may be estimated based on the preamble of the UL transmissions. The inter-STA offsets may be sufficiently low enough since all the STAs are synchronized to the same AP. If the slave triggers are transmitted, the APs may be synchronized with each other, and every STA may be synchronized with its own respective AP.

For power control, the master BSS STAs calculate the transmit power of their UL transmission based on the RSSI target received from the master AP in the master trigger. As presented above, the master trigger also contains the maximum RSSI for the OBSS STAs, determined by the master AP based on how much power (e.g., interference) the master AP can tolerate from OBSS streams. For the OBSS streams, there is a target RSSI for their successful reception in the OBSS, which can be indicated in the master trigger or in the slave trigger if present. The OBSS STAs may calculate the transmit power of their respective MU-MIMO transmissions based on the target RSSI received for their respective slave APs, but subject to the maximum RSSI indicated by the master AP. In some cases, the path-loss calculation of the channel to OBSS APs might require the presence of the slave triggers.

While only two BSSs are shown in FIG. 9, the operations described herein may be extended, for example, to systems with more than 2 BSSs (e.g., third, fourth, etc.).

FIG. 10 illustrates protocol timing diagram 1000 of another option of an enhanced UL MU-MIMO protocol, in accordance with certain aspects of the present disclosure. In this case, the group formation may have already taken place prior to the start of the illustrated operations. As illustrated, the master AP may transmit a master trigger frame. The master trigger frame may indicate the OBSS AP list in a priority order, the maximum RSSI for the OBSS STAs, and the available spatial dimensions. The slave APs may each respond with a slave trigger (e.g., in the sequential order indicated in the master trigger frame) to grab the available spatial dimensions. In some cases, once all the spatial dimensions are claimed by higher priority slave APs, other slave APs may no longer send slave triggers.

The order of OBSS APs may be selected by the master trigger based on reciprocal agreements/behavior, re-use situation, or interference conditions. For example, the priority order may be determined based on a distance from the master AP to the slave APs, or a reciprocal agreement of priority between the master AP and the slave APs. Therefore, the highest priority slave AP gets first priority to use the available resources at the master AP, as indicated by the master trigger. If all the resources are not used by the highest priority slave AP, then the next highest priority slave AP can choose to use the available resources, and so on.

In some cases, the master trigger may also allocate the number of streams to the slave APs. It is then up to the slave APs to use all or a subset of the empty streams. As presented above, the slave APs may not send slave triggers if all the available spatial dimensions have been grabbed. Alternatively, the slave APs listed in the master trigger may send slave triggers regardless of whether the spatial dimensions have all been grabbed by other slave APs. In a case where the master trigger allocates the resources for slave trigger transmission to the slave APs, the slave triggers may be sent simultaneously (e.g., using OFDMA).

For the communication protocol option shown in FIG. 10, the time/frequency synchronization may be implemented with the APs synchronized and STAs synchronize with their respective APs. This time/frequency synchronization technique is easier as it does not require the slave APs to correct for the common time/frequency offset. Power control may be performed by including, in the master trigger, a RSSI target for the master STAs and maximum RSSI for the OBSS STAs, and including RSSI targets in respective slave triggers. The master STAs attempt to meet the RSSI target of the master AP. The slave STAs attempt to meet the RSSI target of their respective slave APs, subject to the maximum RSSI constraint of the master AP.

In some cases, a STA may determine a first transmit power based on the maximum receive signal strength at the first BSS for transmissions from the second BSS, and a second transmit power based on the target receive signal strength for the second BSS. In some cases, in an effort to ensure both are satisfied, the STA may then output the MU frame for transmission using a lesser of the first transmit power and the second transmit power.

For the communication protocols options shown in FIGS. 9 and 10, the ACKs are sent in sequential manner to different STAs, as an illustrative, but not limiting example. In certain aspects, the ACKs of STAs belonging to one BSS may be sent simultaneously and the ACKs to different BSSs may be sent sequentially (e.g., using DL MU-MIMO or DL OFDMA). In addition, the ACKs of STAs belonging to all BSSs may be sent simultaneously (e.g., using distributed MU-MIMO or distributed OFDMA). Distributed OFDMA is used when different APs transmit in different parts of the spectrum in a joint DL OFDMA transmission.

Figure 6A:
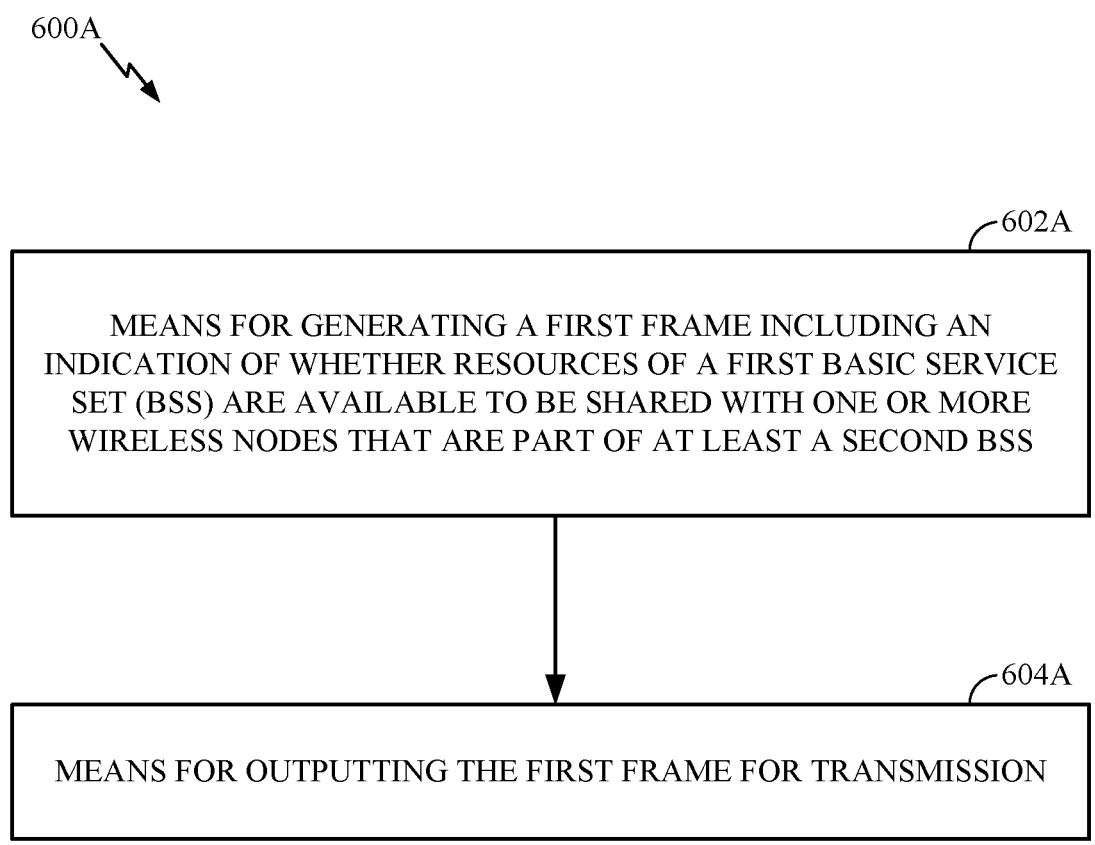
FIG. 6A illustrates example components capable of performing the operations shown in FIG. 6.
Figure 8A:
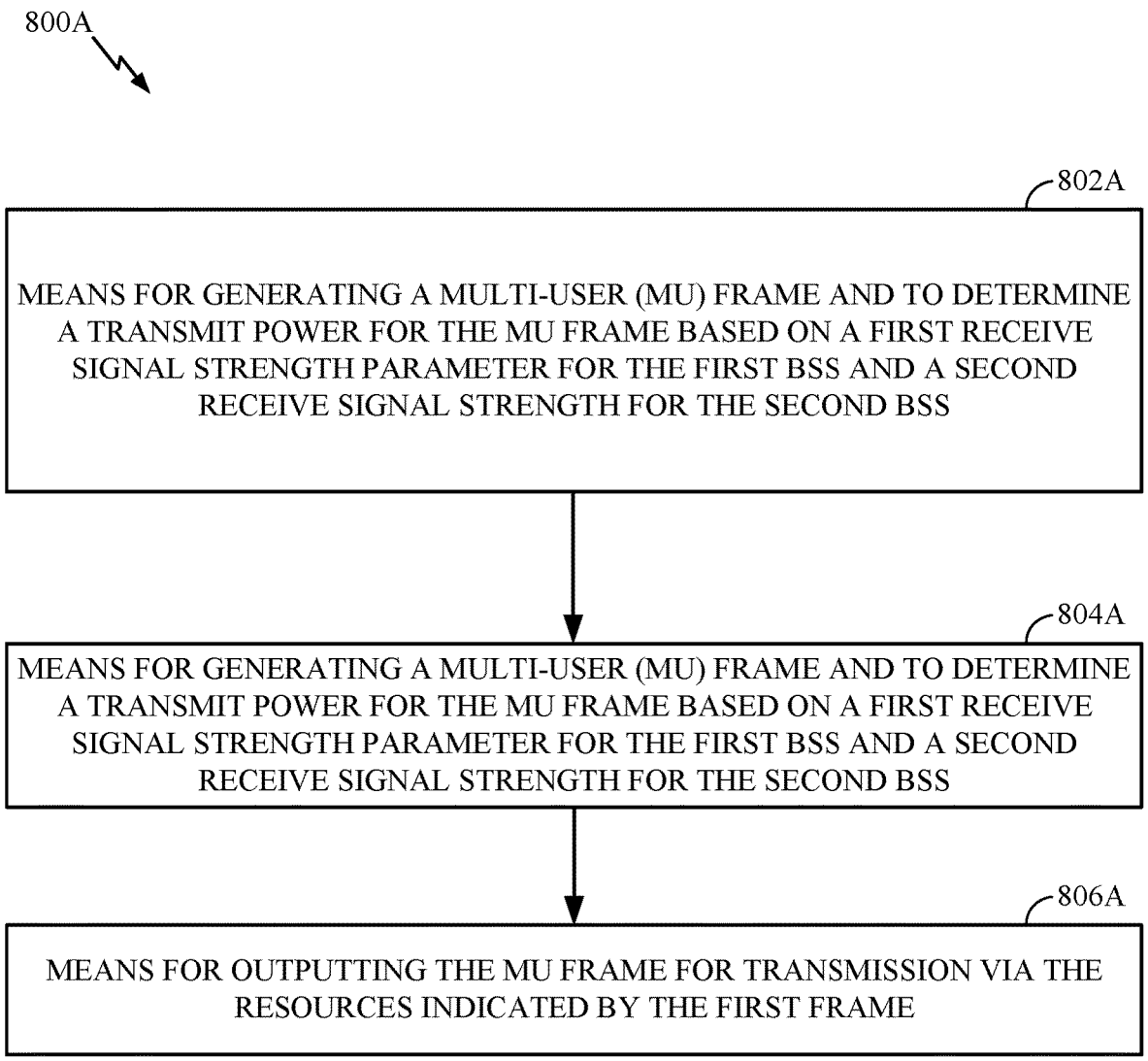
FIG. 8A illustrates example components capable of performing the operations shown in FIG. 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600, 700, and 800 illustrated in FIGS. 6, 7, and 8 correspond to means 600A, 700A, and 800A illustrated in FIGS. 6A, 7A, and 8A.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the station 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 252 of the station 120 illustrated in FIG. 2. Means for processing, means for obtaining, means for generating, means for selecting, means for decoding, means for deciding, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the station 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a station 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a station and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a station and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a processing system configured to generate a first frame including an indication of whether resources of a first basic service set (BSS) are available to be shared with a plurality of wireless nodes that are part of at least a second BSS;
a first interface configured to output the first frame for transmission; and
a second interface configured to obtain simultaneous transmissions from a plurality of devices using one or more spatial streams in the first BSS; wherein:
the processing system is configured to determine a priority order for the wireless nodes, wherein the first frame comprises an indication of the priority order; and
the determination of the priority order is based on at least one of interference conditions, a distance from the apparatus to the plurality of wireless nodes, or a reciprocal agreement of priority between the apparatus and the plurality of wireless nodes.

2. The apparatus of claim 1, wherein the apparatus is part of the first BSS.

3. The apparatus of claim 1, wherein:
the simultaneous transmissions are obtained at the same time as devices in the second BSS are transmitting frames using the resources; and
the processing system is configured to decode the plurality of frames based only on samples obtained by the apparatus in the first BSS.

4. The apparatus of claim 1, wherein the second interface is further configured to:
obtain a second frame, from at least one of the wireless nodes, the second frame including another indication of an intention to use at least a portion of the resources.

5. The apparatus of claim 4, wherein:
the processing system is configured to generate a third frame allocating one or more spatial dimensions to the plurality of wireless nodes; and
the first interface is configured to output the third frame for transmission.

6. The apparatus of claim 5, wherein:
the processor is configured to null interference from transmissions from the plurality of wireless nodes.

7. The apparatus of claim 5, wherein:
the second frame comprises an indication of a spatial stream capability of at least one of the wireless nodes; and
the processing system is configured to determine the one or more spatial dimensions based on the spatial stream capability.

8. The apparatus of claim 5, wherein:
the processing system is further configured to determine a maximum receive signal strength corresponding to the one or more transmissions from the plurality of wireless nodes; and
the third frame further comprises an indication of the maximum receive signal strength.

9. The apparatus of claim 5, wherein:
the third frame further comprises an indication of a modulation and coding scheme.

10. The apparatus of claim 1, wherein:
the processing system is further configured to determine a maximum receive signal strength corresponding to one or more transmissions from the plurality of wireless nodes; and
the first frame comprises an indication of the maximum receive signal strength.

11. The apparatus of claim 1, further comprising at least one antenna via which the first frame is output for transmission, wherein the apparatus is configured as a wireless station.

12. An apparatus for wireless communication, comprising:
a first interface configured to obtain, from a first wireless node, a first frame including an indication of whether resources of a first basic service set (BSS) are available to be shared with a second BSS;
a processing system configured to generate a second frame indicating an intention of the apparatus to use at least a portion of the resources; and
a second interface configured to output the second frame for transmission and configured to obtain simultaneous transmissions from a plurality of devices using the resources in the second BSS; wherein:
the first interface is further configured to obtain, from the first wireless node, a priority order of the apparatus with respect to one or more other wireless nodes; and
the processing system is configured to determine whether the at least the portion of the resources should be used by the apparatus based on the priority order; wherein
the priority order indicates that at least one of the other wireless nodes has a higher priority than the apparatus; and
the determination comprises:
determining whether the at least one of the other wireless nodes has accepted the resources; and
determining that the at least the portion of the resources should be used if the at least one of the other wireless nodes has not indicated an intention to use the resources.

13. The apparatus of claim 12, wherein the apparatus is part of the second BSS.

14. The apparatus of claim 12, wherein:
the simultaneous transmissions are obtained at the same time as devices in the first BSS are transmitting frames using one or more spatial streams; and
the processing system is configured to decode the plurality of frames based only on samples obtained by the apparatus in the second BSS.

15. The apparatus of claim 12, wherein the first frame is obtained from a wireless node that is part of the first BSS.

16. The apparatus of claim 12, wherein:
the processing system is configured to:
determine one or more parameters, the one or more parameters comprising at least one of:
a first parameter indicating a target receive signal strength corresponding to one or more transmissions from wireless nodes of the second BSS; or
a second parameter indicating at least one of a modulation and coding scheme; and
include the one or more parameters in the second frame or a fourth frame.

17. The apparatus of claim 12, wherein the second frame further comprises an indication of a spatial stream capability of the apparatus.

18. The apparatus of claim 12, further comprising at least one antenna via which the first frame is obtained and the second frame is output for transmission, wherein the apparatus is configured as a wireless station.

* * * * *